Oct. 31, 1967  A. F. LA PAN ETAL  3,349,465
TUBE-TO-SHEET JOINT MAKING
Filed May 14, 1965
FIG_1
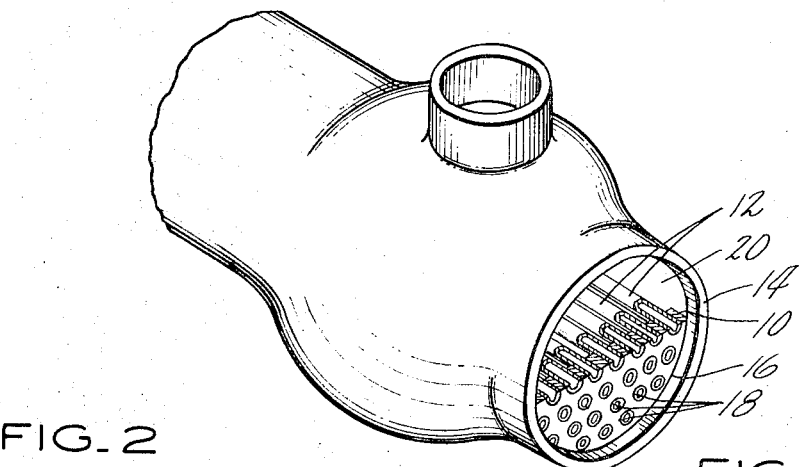
FIG_2
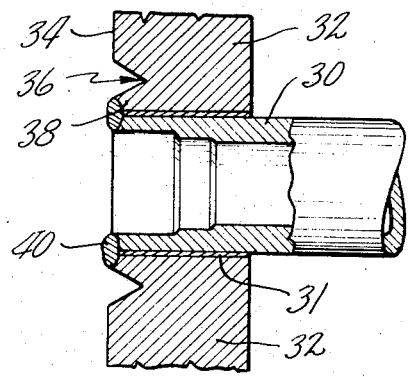
FIG.4
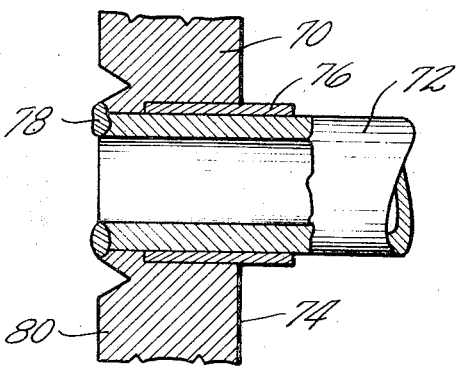
FIG_3
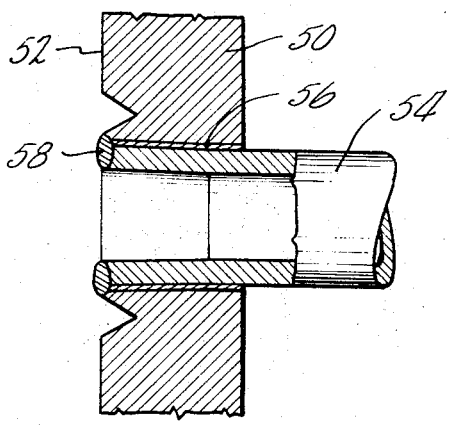
FIG.5
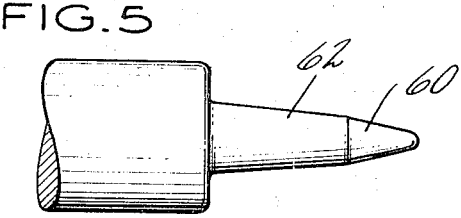
INVENTORS
ALFRED F. LAPAN
ROBERT L. NEUMEISTER
BY Charles A. Warren
ATTORNEY

United States Patent Office 3,349,465
Patented Oct. 31, 1967

3,349,465
TUBE-TO-SHEET JOINT MAKING
Alfred F. La Pan, Baltimore, Md., and Robert L. Neumeister, Glastonbury, Conn., assignors to United Aircraft Corporation, East Hartford, Conn., a corporation of Delaware
Filed May 14, 1965, Ser. No. 455,915
11 Claims. (Cl. 29—157.3)

This invention relates in general to pressure vessels wherein one or more tubes are connected to a tube sheet and, more particularly, to an improved method of bonding tubes to tube sheets in high performance heat transfer apparatus. It contemplates a method of making tube-to-tube sheet joints including incorporation of a light sleeve or plate of a bond-promoting material between a substantial portion of the abutting surfaces of the tube and tube sheet to facilitate solid phase bonding therebetween.

In the fabrication of shell-and-tube heat exchangers by conventional techniques a variety of methods have been employed to effect a connection between the tubes and the tube sheets. In a common construction, the tubes are inserted into holes formed in the tube sheet and a seal weld is made joining the end of the tube to the tube sheet. Although this particular fabrication technique is satisfactory in many applications where a positive seal is required at the tube sheet, in itself it is generally unsatisfactory for use in high temperature, high performance heat exchangers. In this construction, the substantial forces generated by differential thermal expansion between the heat exchanger shell and the tube must be absorbed entirely by the seal welds. Further, vibrations induced in the tubes from internal or external sources are transmitted directly to the seal weld area. Under such conditions the probability of a weld failure is particularly high especially when the materials of construction utilized are characterized by poor weldability with resulting seal welds being of borderline strength.

In another type of heat exchanger construction, the tube-to-tube sheet joint is effected by expanding the tubes into an interference fit with the sheet within holes formed therein. In this manner, the axial forces exerted on the tubes as a result of differential thermal expansion are distributed over the entire area common to the tubes and tube sheet. However, it has been frequently demonstrated that, as a result of frequent temperature and pressure cycling, the tubes are susceptible to loosening within the sheet and a leak path is introduced through the joint adjacent the tube wall. In the presence of substantial tube vibration the probability of a failure of this nature occuring quite naturally increases.

Several modifications have been developed in the art to overcome such difficulties with the pressure-bonded joint. With certain selected materials a diffusional heat treatment is employed to effect solid phase bonding between the contacting metal surfaces, solid phase bonding referring to the process of joining metals together at temperatures below their melting points. As usually performed, the solid phase bonding process contemplates the simultaneous application of heat and pressure. Frequently such a bond may be effected even between materials which are not otherwise ordinarily susceptible to diffusion bonding through the interposition of a third material between the parts to be joined before they are forced into contact under pressure. The intermediate metal usually performs its bond-promoting function by inhibiting the formation of a brittle or impervious alloy zone normally formed between the two base metals where they are in contact. The various metals and other materials used for this purpose are known in the art.

In yet another construction, a relatively soft ductile metal, such as silver or copper, is plated on the ends of the tubes before they are expanded into the holes formed in the tube sheet, the silver forming an intimate bond between the tube and the sheet The ductile material in this case is not ordinarily utilized to promote formation of a diffusion bond between the base materials but rather is utilized more in the nature of a sealant. Because the silver flows more easily than the usual constructional materials used in heat exchangers, it more readily fills even the most minute irregularities in the contacting surfaces, and the joint thus effected is generally more resistant to leakage upon cyclical temperature and pressure variations. When very high unit operating temperatures are envisoned, however, particularly in combination with very corrosive heat transfer fluids, such as liquid metals, it is difficult to select a material which will have the strength, flowability and chemical compatability to perform the sealing and joining functions. Moreover, in an environment of severe vibration, whether internally or externally produced, tubes fixed in this manner have been demonstrated to be susceptible to failure at the point where the tube enters the tube sheet. In tests conducted on heat exchanger models wherein each tube was rigidly held to the tube sheet over the entire area common to both parts, several tubes were observed to shear off cleanly at the lower surface of the tube sheet due to stress concentrations in this area.

In the development of heat transfer equipment, such as heat exchangers, boilers and condensers, for nuclear reactor systems and particularly for those systems designed to operate unattended in outer space, absolute reliability of all tube-to-tube sheet joints is essential to preserve the various fluids in the system in complete isolation with respect to one another. In these applications the equipment is generally designed to operate with very high efficiency at temperatures at which nuclear reactors are operational and is often subjected to severe gravitational loading and vibration during its operation. Moreover, to achieve the requisite high thermal efficiency, corrosive liquid metals are frequently employed as the heat transfer mediums and broad temperature differentials are imposed upon the equipment. Still further, because the system is formulated to possess outstanding heat transfer characteristics, rapid thermal cycling is often imposed upon the equipment upon changes in the heat load resulting from rapidly changing external power requirements.

In view of both the severe operational requirements encountered and the problems evident with tube-to-tube sheet joints effected by conventional techniques, it has been necessary to considerably refine and improve these techniques in order to provide equipment which will maintain its structural integrity for extended periods of time.

It is an object of this invention to provide an improved tube-to-tube sheet joint for high performance heat transfer apparatus and methods for effecting such joints.

It is an additional object of this invention to provide a method of making tube-to-tube sheet joints wherein the tubes are diffusion bonded to the header over a substantial portion of their length and are additionally fastened to the header by means of annular seal welds at their ends.

A further object is to provide a joint wherein stress concentrations are avoided by limiting the depth of the diffusion bond between the tube and sheet to something less than the tube sheet thickness.

A further object is to provide a method whereby, in a single heat treatment, metal recrystallization of the cast weld structure and diffusion bonding between the tube and tube sheet are effected simultaneously, thereby avoiding excessive grain growth.

Additional objects and advantages will be specifically pointed out in the following detailed description or will be obvious from the description or practice of the invention within the scope of the appended claims.

FIGURE 1 is a fragmentary perspective view of a typical high performance liquid metal heat exchanger, partly in section, illustrating particularly the tube sheet construction and placement and the compact tube spacing at the tube sheet.

FIGURE 2 is an enlarged fragmentary sectional view illustrating a first preferred embodiment of the tube-to-tube sheet joint comprising this invention.

FIGURE 3 is a view similar to that of FIGURE 2 illustrating a second embodiment of this invention.

FIGURE 4 is another view similar to that of FIGURE 2 illustrating the joint in a third form.

FIGURE 5 is a perspective view of the mandrel used in forming the joint illustrated in FIGURE 3.

As is most clearly illustrated in FIGURE 1, the typical high performance shell-and-tube heat exchanger includes a tube sheet 10 through which are passed a plurality of closely spaced tubes 12. The tube sheet 10 is connected to the shell 14 by an annular seal weld at 16 to form a leak-tight joint therebetween, and the individual tubes 12 are welded to the tube sheet at its upper surface by means of annular seal welds indicated generally at 18. In this manner the tube-side fluid above the tube sheet 10 is maintained in complete isolation from the shell-side fluid which occupies chamber 20 beneath the tube sheet.

As mentioned previously, the most critical area of fabrication in such heat exchangers lies in the formation of a reliable hermetic joint between the tubes and the tube sheet. A first embodiment of a preferred joint of this type is illustrated in FIGURE 2. The joint in this form has found its greatest utility in stainless steel heat exchangers wherein the internal diameter of the tubes is greater than .186 inch. In this embodiment the tube 30 is plated at its extremity 31 to a length substantially corresponding to the thickness of the tube sheet 32. When the tube and tube sheet are fabricated of stainless steel, nickel has been found to be the preferred plating metal since it promotes the formation of a metallurgical bond between the abutting parts in the fabrication process. It is plated on the outer surface of the tube to a preferred thickness of 0.0005–0.001 inch.

The plated tube 30 is inserted into and through a hole formed in the sheet 32, the diameter of the hole substantially corresponding to the outer diameter of the plated tube, until its upper end is approximately flush with the upper surface 34 of the tube sheet. The upper surface 34 of the tube sheet is trepanned to form an annular groove 36 in the surface 34, the groove encircling the hole and being radially spaced from the hole to form an annular land 38 whose thickness at the surface of the sheet corresponds to the tube wall thickness. In the absence of trepanning, the heavier sheet material acts as a heat sink during the welding operation joining the two parts and heat is conducted away from the weld area so rapidly that the tube material melts and flows before the sheet material fuses. When the surface of the sheet is trepanned, however, melting of the tube and the adjacent portion of the sheet is caused to occur simultaneously and complete fusion and joinder of the parts is assured.

Although other groove shapes are contemplated and have been used, the preferred configuration is generally conical in cross section, formed with a 60 degree included angle to a depth in the tube sheet of one and one-half times the tube wall thickness. This type groove has been found to prevent the land 38 from folding over during the expanding operation and producing a sharp stress riser in this area. After the tube 30 has been inserted into the sheet 32 with the tube end flush with the upper surface 34 of the tube sheet, an annular seal weld 40 is made joining the parts together. It is the normal practice before this weld is made to lightly expand the end of the tube with a drift pin to bring it into intimate contact with the sheet.

Subsequent to the welding operation the tube 30 is expanded into an interference fit of .004–.012 inch with the tube sheet depending on the tube diameter and/or the tube wall thickness. It will, of course, be understood that, if necessary, any excess weld material projecting into the tube interior should be removed prior to the expanding operation. The expansion is preferably performed to a depth of 60–75 percent of the tube sheet thickness, but in no case should the interference fit extend for a distance greater than 85 percent of the sheet thickness. The depth of expansion is thus limited to provide an unbonded area between the abutting metal surfaces to a height of at least 15 percent of the sheet thickness when measured from the bottom surface of the sheet. This is mandatory to prevent a stress concentration at the lower surface of the sheet since this has been demonstrated to promote tube failure at this point.

Although the expansion to the entire depth over which bonding is desired may be and has been performed in a single pass, in order to effect blending of the tube wall after the expansion operation, it has been found advisable to expand the tube in two steps, including a first pass to a depth of approximately 50 percent of the sheet thickness to the maximum desired interference fit followed by a subsequent pass to an additional 25 percent of sheet thickness at half of the maximum desired interference. The cross-sectional profile of the tube wall following a two-step expansion operation is illustrated in FIGURE 2.

The tube is expanded with a commercial type roll tube expander which is generally fabricated of hardened tool steel to a diameter calculated to provide the required interference between the tube wall out the abutting surface of the sheet.

After the tube expansion has been completed, the assembly is heat treated in a non-contaminating atmosphere at a temperature sufficient to effect metal recrystallization of the cast weld material into a wrought structure, stress relief, and solid phase bonding of the joint at the area where the tube has been forced into an interference fit with the tube sheet. The heat treatment temperature necessary to complete the stress relief and diffusion bonding is dependent upon the particular materials utilized and as such is well known to those skilled in the art. In the case of 300 series stainless steel, for example, a heat treatment at 1900° F. for one to two hours in argon, hydrogen or vacuum has been found to be satisfactory. Because the stress relief and diffusion bonding is effected in a single heating operation, metallographic examination has revealed that excessive and detrimental grain growth is avoided in this process.

A second preferred tube-to-header joint is illustrated in FIGURE 3. In this form the hole in the header 50 is tapered slightly from the upper surface 52 of the tube sheet and the tube 54 is given a corresponding taper. The length of the tapered portion of the hole is 80 percent of the tube sheet thickness or .440 inch, whichever is less, and the taper angle is ¼ inch per foot. The taper angle and depth of taper is limited by the allowable tube expansion and consequent thinning of the tube wall.

In general, the fabrication procedure for this type of joint is similar to that used in connection with the joint depicted and described in connection with FIGURE 2. Prior to insertion in the hole in the tube sheet, the tube 54 is plated with a thin layer 56 of a bond-promoting material and the tube is expanded slightly with a tapered mandrel such as that shown in FIGURE 5 to conform to the taper of the hole before the annular seal weld 58 is made. Subsequent to the welding operation, the tube is expanded into an interference fit with the tube sheet, the depth of expansion being from 65–75 percent of the tapered length. When a tapered mandrel is used, it has been found advantageous to limit the expansion to approximately .003 inch per pass until the desired expansion is completed.

The type of joint illustrated in FIGURE 3 has been found to have its greatest utility in the formation of heat exchangers utilizing tubes having an internal diameter of less than .186 inch and those fabricated of the cobalt-base alloys.

The tapered mandrel shown in FIGURE 5, which is utilized in forming this tapered joint, is fabricated of hardened tool steel with a wall blending nose portion 60 tapered at an angle of 2 inches per foot and a shank portion 62 tapered at an angle of ¼ inch per foot, which is the expanding portion of the mandrel. It is, of course, obvious that the diameter of the mandrel will substantially correspond to the internal diameter of the tube being processed.

A third form of the joint comprising this invention is illustrated in FIGURE 4 and this form of joint is utilized where it is desired to prevent dilution of the weld with the plating or bond-promoting material. In this form the sheet 70 is provided with a hole which substantially corresponds to the outer diameter of the tube 72. Prior to insertion of the tube into the sheet 70, the sheet is counterbored from its bottom surface 74 to accommodate a sleeve 76 of bond-promoting material. The depth of the counterbore is such that no melting of the sleeve 76 will occur when the annular seal weld 78 is made.

The type of joint has found utility in the formation of heat exchangers from columbium base alloys. In these heat exchangers and with these materials it has been found that no melting of the sleeve will occur if the counterbore extends to a distance not less than .150 inch from the upper surface 80 of the tube sheet.

In the fabrication of columbium and columbium alloy heat exchangers, vanadium in the form of a sleeve having a nominal will thickness of .003–.010 inch, is used as the bond-promoting material although the sleeve thickness is held uniform within 0.0005 inch. With this construction the welding, expanding and heat treating operations are performed in a manner similar to those described in connection with the other embodiments of this joint, i.e., the tube is expanded into an interference fit of .004–.012 inch with the tube wall to a depth of 65–75 percent of the sheet thickness. In the case of columbium alloys, the assembly has been heat treated at 2200° F. for one to two hours in argon or vacuum with satisfactory results.

Heat exchangers incorporating the tube-to-tube sheet joints above-described have been tested for up to 10,000 hours at 2000° F. in a liquid metal environment with no weakening of the joint evident on metallurgical examination.

It will be apparent from the foregoing that the described invention provide a strong and reliable tube-to-tube sheet joinnt which is capable of withstanding the severe operational requirement necessary for efficient heat transfer in high performance equipment. While several preferred embodiments of the invention have been described, obvious modifications of structure and substitution of materials will be evident to those skilled in the art within the scope of the following claims.

We claim:

1. The method of joining a thin-walled metal tube to a thicker perforated metal sheet, the hole in the perforated sheet being adapted to receive the tube in close-fitting relation, comprising the steps of:
    inserting the tube into the hole until its upper end is substantially flush with the upper surface of the sheet,
    interposing between the tube and the surface of the hole a layer of a bond-promoting material,
    effecting a fusion seal weld between the end of the tube and the sheet,
    expanding the tube into an interference fit with the sheet to a depth between about 50 percent to about 80 percent of the sheet thickness, and
    heat treating at a temperature sufficient to effect recrystallization of the weld structure and solid phase bonding in the area of the interference fit.

2. The method of claim 1 wherein:
    the tube and the sheet are formed of alloys selected from the group consisting of the iron, cobalt and nickel base alloys, and
    the bond-promoting material is nickel.

3. The method of claim 2 wherein:
    the nickel comprises a plate on the tube of a thickness of approximately 0.001 of an inch, and
    the interference fit is 0.004–0.012 of an inch to a depth of 50–80 percent of the sheet thickness.

4. The method of claim 3 wherein:
    the iron base alloy is a 300 series stainless steel, and
    the heat treating temperature is about 1900° F.

5. The method of joining a thin-walled metal tube to a thicker perforated metal sheet, the hole in the sheet substantially corresponding in diameter to the outer diameter of the tube comprising the steps of:
    counterboring the hole in the sheet from the lower surface thereof,
    inserting in the counterbored hole a close-fitting annular sleeve of a bond-promoting material, the inner diameter of the sleeve substantially corresponding to the outer diameter of the tube,
    inserting the tube into the sheet until its upper end is substantially flush with the upper surface of the sheet,
    effecting a fusion seal weld between the end of the tube and the sheet,
    expanding the tube into an interference fit with the sheet and the sleeve to a depth between about 50 percent to about 80 percent of the sheet thickness, and
    heat treating at a temperature sufficient to effect recrystallization of the cast weld structure and solid phase bonding in the area of the interference fit.

6. The method of claim 5 wherein:
    the tube and the sheet are fabricated of columbium base alloys,
    the depth of the counterbored hole is such that no melting of the sleeve occurs when the seal weld is made, and
    the sleeve material is essentially vanadium.

7. The method of claim 6 wherein:
    the interference fit is 0.004–0.012 of an inch to a depth of 50–80 percent of the sheet thickness, and
    the heat treating temperature is about 2200° F.

8. The method of joining a thin-walled metal tube to a thicker perforated sheet, the hole in the sheet being tapered from its upper end to a substantial depth and substantially corresponding in diameter at its lower end to the outer diameter of the tube, the hole being encircled at its upper end by an annular groove radially spaced therefrom at a distance equal to the tube wall thickness, comprising the steps of:
    inserting a plated tube into the hole until its upper end is substantially flush with the upper surface of the sheet, the plate on the tube consisting of a bond-promoting material,
    expanding the tube lightly over the tapered depth of the hole to effect a taper of the tube substantially corresponding to the taper of the hole,
    effecting a fusion seal weld between the end of the tube and the sheet,
    expanding the tube into an interference fit with the sheet to a depth between about 50 percent to about 80 percent of the taper depth, and
    heat treating at a temperature sufficient to effect recrystallization of the cast weld structure and solid phase bonding in the area of the interference fit.

9. The method of claim 7 wherein:

the tube and sheet are fabricated of an alloy selected from the group consisting of the iron, cobalt and nickel base alloys, and the bond-promoting material is essentially nickel.

10. The method of claim 8 wherein:

the taper of the hole is about 0.25 of an inch per foot, the depth of the taper is 60–85 percent of the sheet thickness, and the interference fit is 0.004–0.012 of an inch to a depth of 60–80 percent of the tapered depth.

11. The method of forming tube-to-tube sheet joints in which the tube extends through the tube sheet, the tube sheet having an annular groove in its upper surface encircling the hole therein, the groove being spaced from the hole by a distance substantially corresponding to the tube wall thickness comprising the steps of:

inserting the tube into the hole until its upper end is substantially flush with the upper surface of the tube sheet, interposing between the tube and the tube sheet a layer of a bond-promoting material of a thickness of from 0.001–0.010 of an inch, effecting a fusion seal weld between the end of the tube and the tube sheet, expanding the tube into an interference fit with the tube sheet of 0.004–0.012 of an inch to a depth of 65–75 percent of the tube sheet thickness, and heat treating at a temperature sufficient to effect recrystallization of the cast weld structure and solid phase bonding in the area of the interference fit.

References Cited
UNITED STATES PATENTS

| | | | |
|---|---|---|---|
| 2,678,224 | 5/1954 | Kooistra | 29—157. 4X |
| 2,785,459 | 3/1957 | Carpenter | 29—492 X |
| 3,015,508 | 1/1962 | Kunz | 29—484 X |
| 3,025,596 | 3/1962 | Ward et al. | |
| 3,034,211 | 5/1962 | Roehl et al. | 29—497 X |
| 3,078,551 | 2/1963 | Patriarca et al. | 29—157.4 |
| 3,120,400 | 2/1964 | Carpenter | 29—157.4 X |

JOHN F. CAMPBELL, *Primary Examiner.*

P. M. COHEN, *Assistant Examiner.*